United States Patent
Mutnuru (10) Patent No.: US 9,571,570 B1
(45) Date of Patent: Feb. 14, 2017

(54) WEIGHTED RENDEZVOUS HASHING

(71) Applicant: Juniper Networks, Inc., Sunnyvale, CA (US)

(72) Inventor: Rishi K. Mutnuru, Santa Clara, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 225 days.

(21) Appl. No.: 14/494,999

(22) Filed: Sep. 24, 2014

(51) Int. Cl.
*H04L 29/08* (2006.01)
*H04L 12/803* (2013.01)
*G06F 11/34* (2006.01)

(52) U.S. Cl.
CPC ....... *H04L 67/1023* (2013.01); *G06F 11/3433* (2013.01); *H04L 67/1029* (2013.01)

(58) Field of Classification Search
CPC .............. H04L 67/1023; H04L 67/1029; G06F 11/3433
See application file for complete search history.

(56) References Cited

U.S. PATENT DOCUMENTS

| 7,020,153 | B2 | 3/2006 | Droz et al. | |
| 7,676,561 | B1* | 3/2010 | Rai | G06F 9/505 709/223 |
| 8,583,625 | B2 | 11/2013 | Peterson et al. | |
| 2010/0131946 | A1* | 5/2010 | Degaonkar | G06F 11/2025 718/1 |
| 2011/0153810 | A1* | 6/2011 | Raja | H04L 67/1029 709/224 |
| 2013/0297798 | A1* | 11/2013 | Arisoylu | H04L 67/1027 709/226 |
| 2014/0254374 | A1* | 9/2014 | Janakiraman | H04L 47/10 370/235 |
| 2016/0026660 | A1* | 1/2016 | Mukherjee | G06F 17/30289 707/803 |

OTHER PUBLICATIONS

Wikipedia, "Rendezvous hashing", http://en.wikipedia.org/wiki/Rendezvous_hashing, Jul. 24, 2014, 3 pages.
Thaler et al., "Using Name-Based Mappings to Increase Hit Rates", IEEE/ACM Transactions on Networking, vol. 6, No. 1, Feb. 1998, 14 pages.

* cited by examiner

*Primary Examiner* — Brian J Gillis
*Assistant Examiner* — Amy Ling
(74) *Attorney, Agent, or Firm* — Harrity & Harrity, LLP (57) ABSTRACT

A device may be configured to store virtual identifier information indicating virtual identifiers associated with servers. The virtual identifier information may associate a quantity of virtual identifiers with each respective server of the servers based on a weight associated with the respective server. The device may receive an object identifier identifying an object to be processed by at least one of the servers. The device may calculate hash values for the virtual identifiers based on the object identifier. The device may determine a virtual identifier associated with a hash value that satisfies a particular condition. The device may select a server associated with the virtual identifier. The device may send an instruction to the server to process the object.

20 Claims, 10 Drawing Sheets

WEIGHTED RENDEZVOUS HASHING

BACKGROUND

Rendezvous hashing allows clients to achieve distributed agreement on a device an object is to be stored. Load balancing servers may use rendezvous hashing to load balance multiple backend servers.

SUMMARY

Some implementation described herein may provide a device including one or more processors. The device may store virtual identifier information indicating a plurality of virtual identifiers associated with a plurality of servers. The virtual identifier information may associate a quantity of virtual identifiers with each respective server of the plurality of servers based on a weight associated with the respective server. The device may receive an object identifier identifying an object to be processed by at least one of the plurality of servers. The device may calculate hash values for the plurality of virtual identifiers based on the object identifier. The device may determine a virtual identifier associated with a hash value that satisfies a particular condition. The hash values may include the hash value, and the plurality of virtual identifiers may include the virtual identifier. The device may select a server associated with the virtual identifier. The plurality of servers may include the server. The device may send an instruction to the server to process the object.

Some implementations described herein may provide a computer-readable medium storing instructions. The instructions may cause a device to store virtual identifier information indicating a plurality of virtual identifiers associated with a plurality of servers. The virtual identifier information may associate a quantity of virtual identifiers with each respective server of the plurality of servers based on a weight associated with the respective server. The instructions may cause the device to receive an object identifier identifying an object to be stored by at least one of the plurality of servers. The instructions may cause the device to calculate hash values for the plurality of virtual identifiers based on the object identifier. The instructions may cause the device to determine a virtual identifier associated with a hash value that satisfies a particular condition. The hash values may include the hash value, and the plurality of virtual identifiers may include the virtual identifier. The instructions may cause the device to select a server associated with the virtual identifier. The plurality of servers may include the server. The instructions may cause the object to the server to be stored.

Some implementations described herein may provide a method including storing, by a device, virtual identifier information indicating a plurality of virtual identifiers associated with a plurality of servers. The virtual identifier information may associate a quantity of virtual identifiers with each respective server of the plurality of servers based on a weight assigned to the respective server. The method may including receiving, by the device, an object identifier identifying an object requested by a requesting device. The method may include calculating, by the device, hash values for the plurality of virtual identifiers based on the object identifier. The method may include determining, by the device, a virtual identifier associated with a hash value that satisfies a particular condition. The hash values may include the hash value, and the plurality of virtual identifiers may include the virtual identifier. The method may include selecting, by the device, a server associated with the virtual identifier. The plurality of servers may include the server. The method may include obtaining, by the device, the object from the server. The method may include sending, by the device, the object to the requesting device.

DETAILED DESCRIPTION

The following detailed description of example implementations refers to the accompanying drawings. The same reference numbers in different drawings may identify the same or similar elements.

In rendezvous hashing, each client (e.g., a load balancing server) may compute hash values based on an object and a backend server identifier, and select a backend server with a highest hash value. Accordingly, when multiple load balancing servers balance a load across multiple backend servers, each load balancing server may independently select the same backend server to store the object and/or retrieve the object by using the same hash function. In other words, the load balancing servers may rendezvous at the same backend server. Moreover, the hash function used by rendezvous hashing may result in an equal probability that any given backend server will be selected for a given object. Accordingly, rendezvous hashing may equally distribute a load across the backend servers.

However, equally distributing a load across the backend servers may not be an optimal use of resources. For example, different backend servers in an enterprise data center or cloud environment may be of different capacity and/or configuration. Thus, the load each backend server is capable of handling may differ between backend servers and equally distributing the load among the backend servers may not be an optimal use of the backend servers.

Implementations described herein may assign weights to backend servers such that rendezvous hashing may distribute a load among the backend servers based on the weights of the backend servers. Moreover, implementations described herein may ensure consistency, distribution, and weighting are achieved on a traffic load balancing server while load balancing the backend servers. Furthermore, implementations described herein may reduce a disruption caused by a backend server being added or removed compared to non-weighted rendezvous hashing, and may reduce an amount of processing resources used when selecting a backend server compared to non-weighted rendezvous hashing.

Figure 1A:
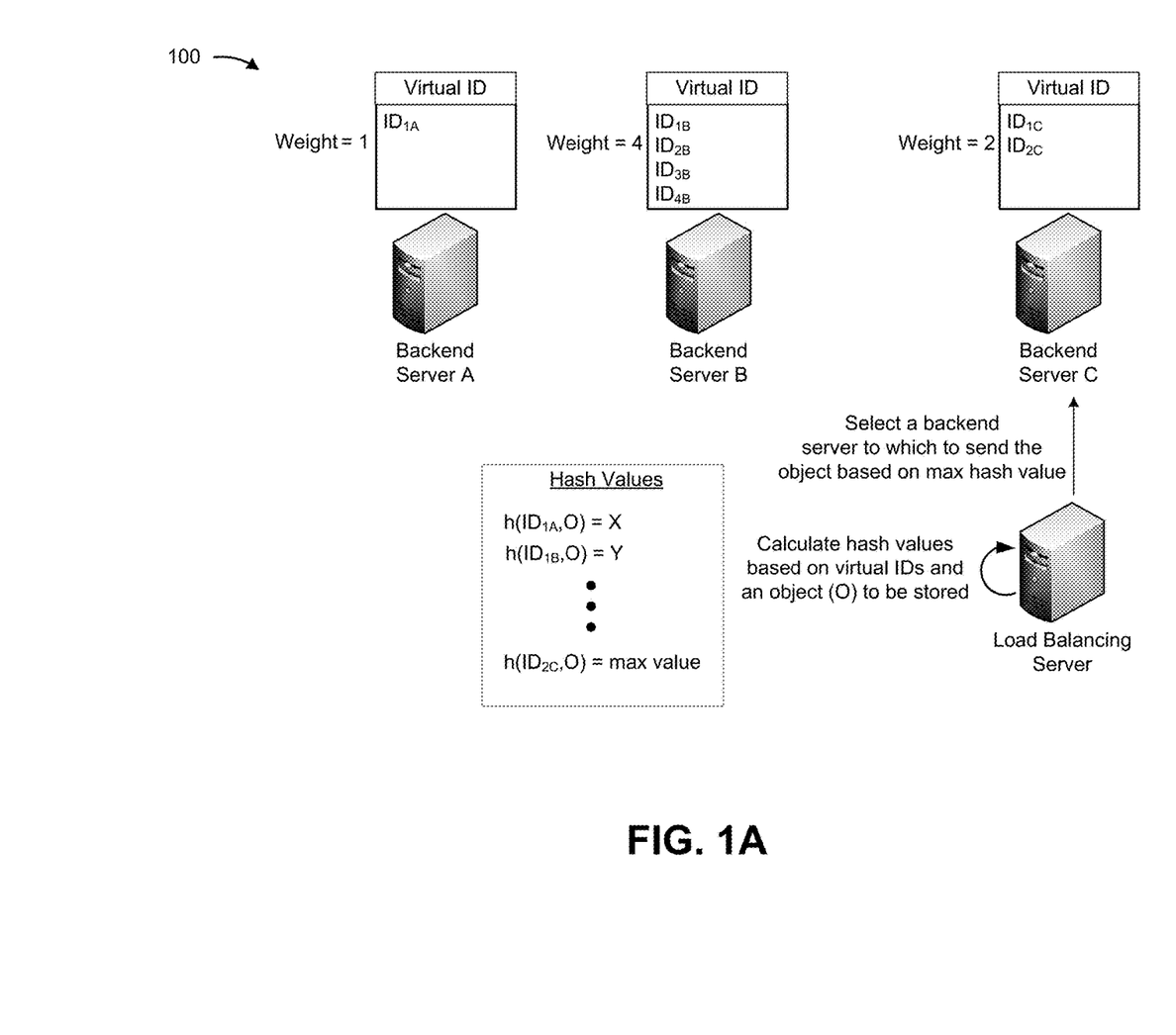
FIGS. 1A and 1B are diagrams of an overview of an example implementation described herein.
Figure 1B:
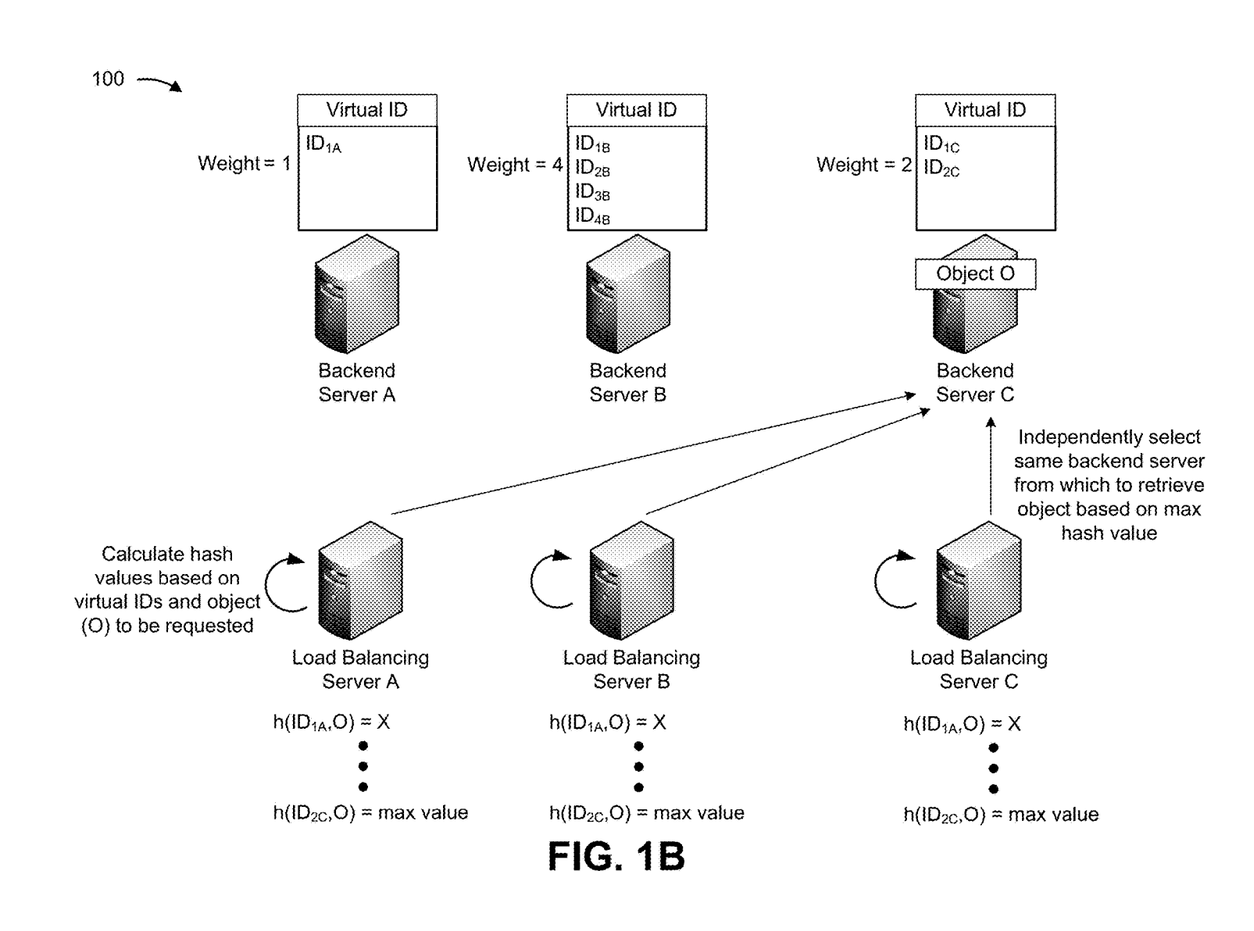

FIGS. 1A and 1B are diagrams of an overview of an example implementation 100 described herein. In FIG. 1A, assume a load balancing server balances loads for backend servers A-C. For example, the load balancing server may distribute objects (e.g., webpages, files, etc.) to backend servers A-C to be cached. Further, assume backend server A is assigned a weight of one, backend server B is assigned a weight of four, and backend server C is assigned a weight of two based on the configuration and/or capabilities of backend servers A-C. Also, assume that a quantity of virtual IDs equal to the respective weights are assigned to each of backend servers A-C. For example, backend server A may be assigned one virtual identifier (ID) (e.g., $ID_{1A}$), backend server B may be assigned four virtual IDs (e.g., $ID_{1B}$, $ID_{2B}$, $ID_{3B}$, and $ID_{4B}$), and backend server C may be assigned two virtual IDs (e.g., $ID_{1C}$ and $ID_{2C}$).

In FIG. 1A, assume an object is provided to a load balancing server to be stored on one of backend servers A-C. As shown in FIG. 1A, load balancing server may calculate hash values based on the virtual IDs VIDs and the object O to be placed. For example, the load balancing server may calculate hash values using a hash function h(VID, O) for each virtual ID. The load balancing server may identify the maximum hash value and identify a virtual ID associated with the maximum hash value. The load balancing server may then select a backend server to which the identified virtual ID is assigned as the backend server to which to send the object for storage.

For example, as shown in FIG. 1A, assume virtual ID $ID_{2C}$ is associated with the maximum hash value. Because virtual ID $ID_{2C}$ is assigned to backend server C, the load balancing server may send the object to backend server C and backend server C may store the object.

Because each virtual ID may have an equal probability of resulting in a maximum hash value for a given object, the probability that a particular backend server will be selected to store the object may be proportional to the weight of the backend server (e.g., the quantity of virtual IDs assigned to the backend server). In this way, the load may balance across the backend servers in a weighted manner.

In FIG. 1B, assume load balancing servers A-C balance the load of backend servers A-C. Further, assume a request to retrieve the object is received at one of the load balancing servers A-C. Regardless of which load balancing server A-C receives the request, each load balancing server A-C may independently select the same backend server from which to retrieve the object. In other words, load balancing servers A-C may independently rendezvous at the same backend server.

Assume each of load balancing servers A-C stores the same hash function and information identifying the same virtual IDs for backend servers A-C. Accordingly, each load balancing server may calculate the same hash values for the requested object O, and each load balancing server may identify a virtual ID associated with the maximum hash value as discussed with respect to FIG. 1A. Likewise, each load balancing server A-C may independently select the same backend server (e.g., backend server C that stores object O) from which to retrieve the object. One of the load balancing servers A-C may retrieve the object from the selected backend server and send the object to a device that requested the object.

In this way, the load balancing servers may independently select a same backend server when the backend servers are weighted without having to store a data structure associating each of hundreds, thousands, millions, or billons of objects with backend servers that store the objects.

Figure 2:
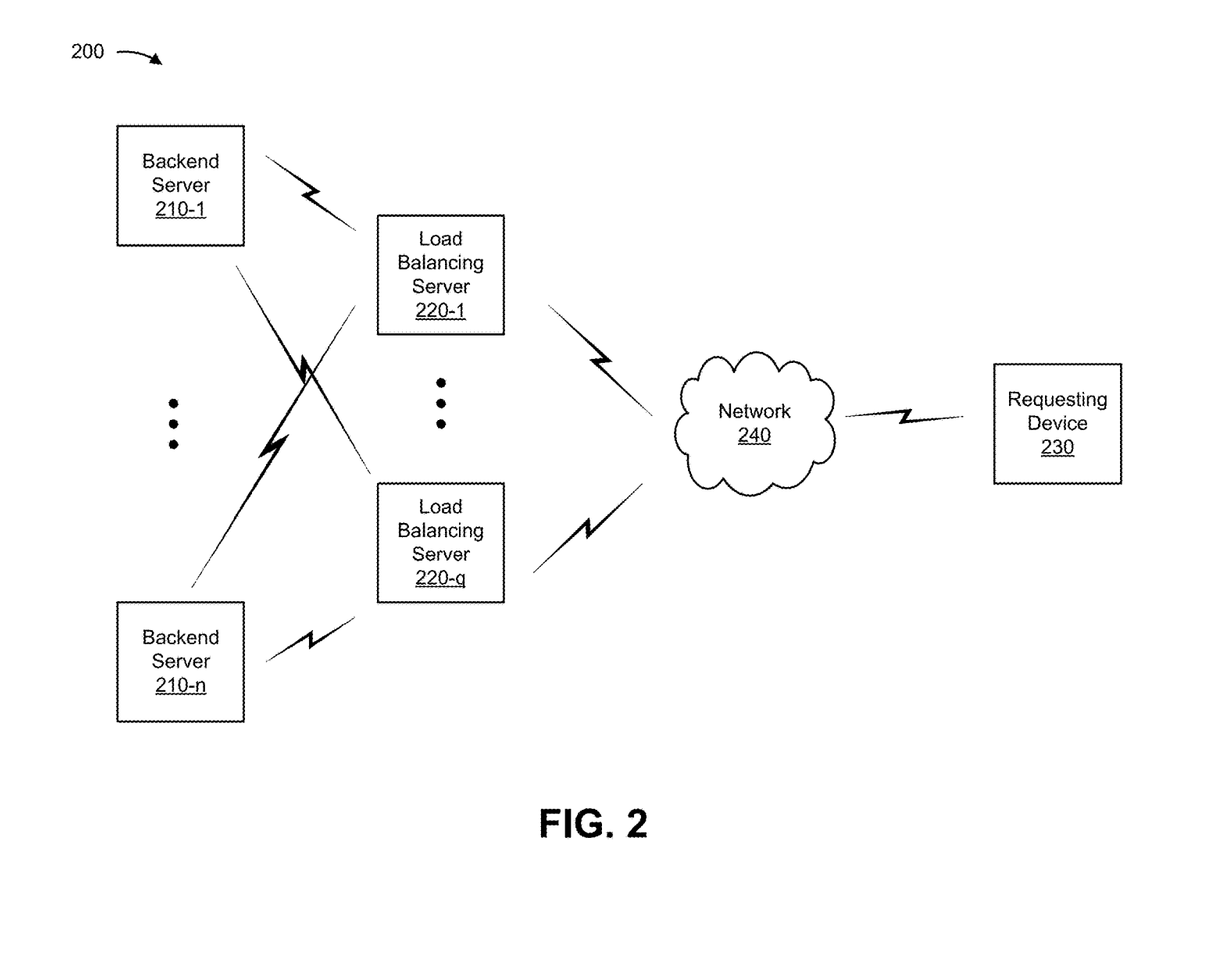
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include backend servers 210-1 through 210-n (n≥1) (hereinafter referred to collectively as "backend servers 210," and individually as "backend server 210"), load balancing servers 220-1 through 220-q (q≥1) (hereinafter referred to collectively as "load balancing servers 220," and individually as "load balancing server 220"), requesting device 230, and/or network 240. Devices of environment 200 may interconnect via wired connections, wireless connections, or a combination of wired and wireless connections.

Backend server 210 may include one or more devices capable of storing and/or processing information. For example, backend server 210 may include a cache server, a database server, a memory controller, or the like that stores cached information and/or performs processing tasks. In some implementations, backend server 210 may include a communication interface that allows backend server 210 to receive information from and/or transmit information to other devices in environment 200.

Load balancing server 220 may include one or more devices capable of storing, processing, and/or routing information. For example, load balancing server 220 may distribute tasks to backend servers 210 and/or information to be stored by backend servers 210. Multiple load balancing servers 220 may distribute tasks and/or information to a same group of backend servers 210. In some implementations, load balancing server 220 may include a communication interface that allows load balancing server 220 to receive information from and/or transmit information to other devices in environment 200.

Requesting device 230 may include a device capable of receiving, generating, storing, processing, and/or providing information. For example, requesting device 230 may include a communications and/or computing device, such as a mobile phone (e.g., a smart phone, a radiotelephone, etc.), a laptop computer, a tablet computer, a desktop computer, a handheld computer, a gaming device, or a similar device. Additionally, or alternatively, requesting device 230 may include a server device. In some implementations, requesting device 230 may receive information from and/or transmit information to another device in environment 200.

Network 240 may include one or more wired and/or wireless networks. For example, network 240 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
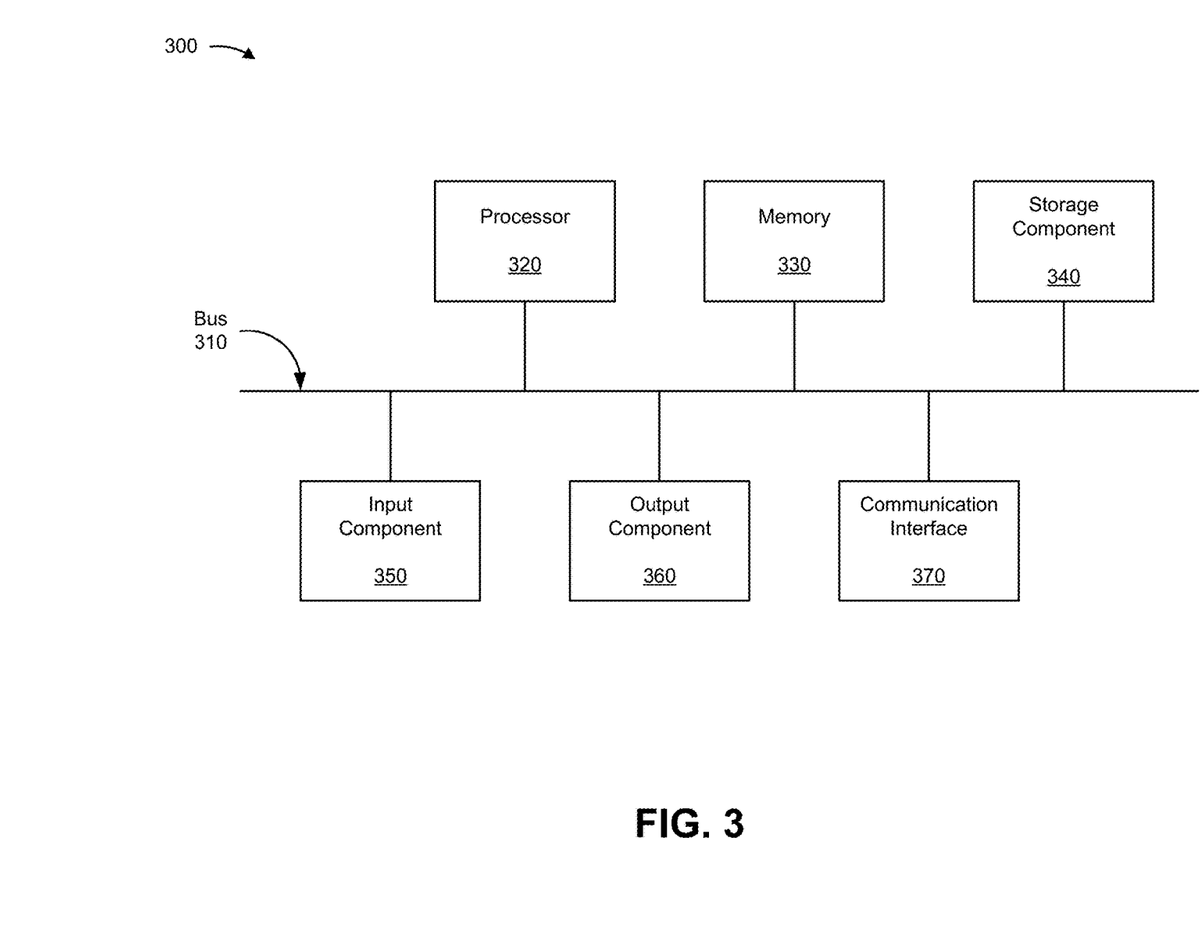
FIG. 3 is a diagram of example components of one or more devices of FIG. 2.

FIG. 3 is a diagram of example components of a device 300. Device 300 may correspond to backend server 210, load balancing server 220, and/or requesting device 230. In some implementations, backend server 210, load balancing server 220, and/or requesting device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
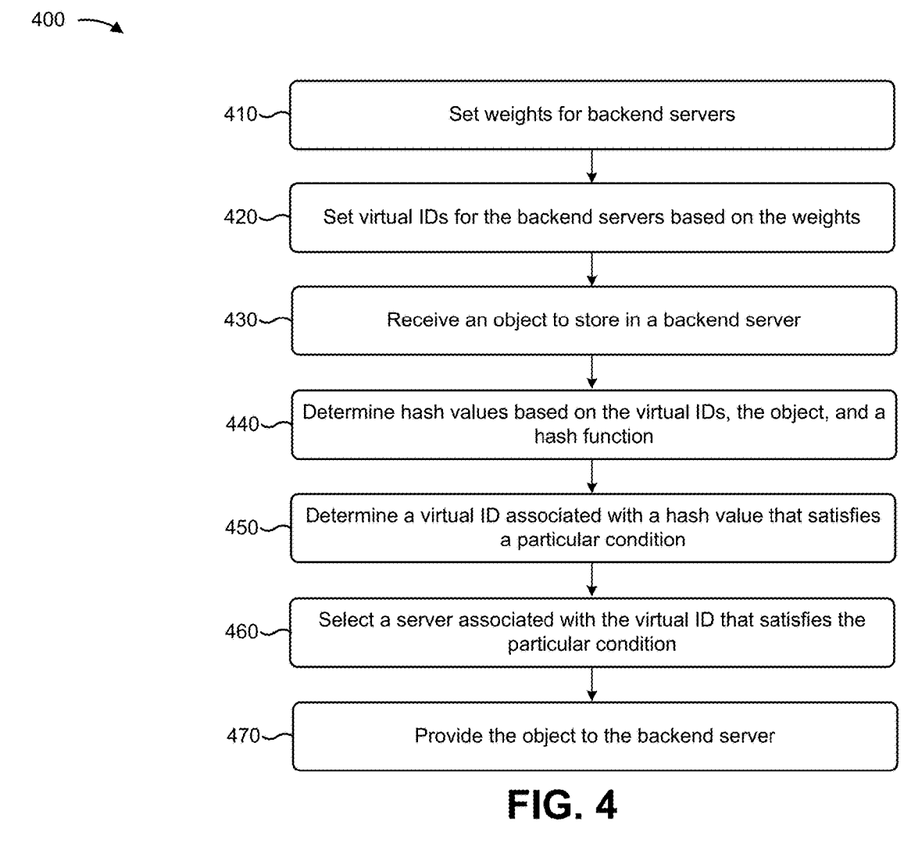
FIG. 4 is a flow chart of an example process for selecting a backend server to store an object.

FIG. 4 is a flow chart of an example process 400 for selecting a backend server 210 to store an object. In some implementations, one or more process blocks of FIG. 4 may be performed by load balancing server 220. In some implementations, one or more process blocks of FIG. 4 may be performed by another device or a group of devices separate from or including load balancing server 220, such as backend server 210 and/or requesting device 230.

As shown in FIG. 4, process 400 may include setting weights for backend servers 210 (block 410). For example, load balancing server 220 may set weights for each backend server 210 connected to and/or controlled by load balancing server 220.

In some implementations, an administrator may input weight information indicating a weight of each backend server 210 into load balancing server 220. For example, the weight information may associate a backend server identifier, which identifies a backend server 210, and a weight. Load balancing server 220 may receive the weight information and store the weight information indicating the weight for each backend server 210.

If there are multiple load balancing servers 220 that are connected to and/or control the same group of backend servers 210, then the administrator may input the weight information into each load balancing server 220 such that each load balancing server 220 stores the same weight information.

Additionally, or alternatively, load balancing server 220 may receive property information indicating properties for a backend server 210 from another device (e.g., from a respective backend server 210) and/or via a user input. The property information may indicate a processing capability of backend server 210, an amount of data that may be stored by backend server 210, etc. Load balancing server 220 may set a weight for a backend server 210 based on the properties of a backend server 210. For example, a first backend server 210 having a greater processing capability and/or more storage may be given a greater weight than a second backend server 210 having a lesser processing capability and/or less storage.

If there are multiple load balancing servers 220 that are connected to and/or control the same group of backend servers 210, then the property information may be provided to each backend server 210, and a backend server 210 may set a weight for each backend server 210 based on the property information. For example, each load balancing server 220 may use a same algorithm to set the weights based on the property information. In some implementations, a load balancing server 220 may distribute the property information to other load balancing servers 220 such that each load balancing server 220 may set a same weight for a backend server 210 based on the same property information.

Alternatively, or alternatively, a load balancing server 220 may receive or generate the weight information, and distribute the weight information to other load balancing servers 220 such that all load balancing servers 220 store the same weight information.

As further shown in FIG. 4, process 400 may include setting virtual identifiers (virtual IDs) for the backend servers 210 based on the weights (block 420). For example, load balancing server 220 may set the virtual IDs for the backend servers 210 based on the weights.

In some implementations, a quantity of virtual IDs associated with each backend server 210 may be based on the weight for the backend server 210. For example, the quantity of virtual IDs for a backend server 210 may be equal to the weight of the respective backend server 210. For instance, if a backend server 210 has a weight of X, then X number of virtual IDs may be set for the backend server 210. Load balancing server 220 may store virtual ID information that associates one or more virtual IDs for a backend server 210 with a backend server identifier that identifies the backend server 210.

In some implementations, an administrator may input the virtual ID information into load balancing server 220 that indicates the virtual IDs for backend servers 210. Load balancing server 220 may receive the virtual ID information and store the virtual ID information in a memory included in or accessible by load balancing server 220.

If there are multiple load balancing servers 220 that are connected to and/or control the same group of backend servers 210, then the administrator may input the virtual ID information into each load balancing server 220 such that each load balancing server 220 stores the same virtual ID information. Alternatively, a load balancing server 220 may distribute the virtual ID information to other load balancing servers 220 such that all load balancing servers 220 store the virtual ID information.

In some implementations, load balancing server 220 may generate the virtual ID information for the backend servers 210 based on the weights. For example, load balancing server 220 may generate a quantity of virtual IDs for a backend server 210 equal to the weight of the backend server 210. Load balancing server 220 may distribute the virtual ID information to other load balancing servers 220 such that all load balancing servers 220 store the same virtual ID information.

Alternatively, each load balancing server 220 may generate the same virtual ID information using a same algorithm. For example, each load balancing server 220 may generate the same virtual IDs for backend servers 210 based on the weights of backend servers 210, the property information for backend servers 210, and/or backend server identifiers for backend servers 210. In this way, each load balancing server 220 may generate and store the same virtual ID information.

As further shown in FIG. 4, process 400 may include receiving an object to store in a backend server 210 (block 430). For example, load balancing server 220 may receive an object to store in a backend server 210.

An object may include information to be stored (e.g., cached) in a backend server 210. For example, the object may include a webpage, a multimedia file, a text file, and/or another kind of data.

In some implementations, load balancing server 220 may receive a new object to be stored in a backend server 210 that is not already stored in one of the backend servers 210. For example, load balancing server 220 may receive an object from requesting device 230 and/or another device.

Additionally, or alternatively, load balancing server 220 may receive an object from a first backend server 210 to be stored in a second backend server 210.

For example, the first backend server 210 may be undergoing maintenance or otherwise be unable to properly store, process, and/or retrieve an object. Accordingly, the first backend server 210 may provide the object, and possibly other objects stored by the first backend server 210, to load balancing server 220 to distribute to other backend server(s) 210 for storage. Additionally, or alternatively, load balancing server 220 may identify the object(s) stored by the first backend server 210, obtain copies of the object(s) from another device, and distribute the copy or copies among other backend servers 210.

As another example, a backend server 210 may be newly added to the multiple backend servers 210 managed by load balancing server 220. Accordingly, load balancing server 220 may redistribute one or more the objects stored by the multiple backend servers 210 to the new backend server 210 for storage to more evenly distribute the stored information among the load balancing servers 220.

As further shown in FIG. 4, process 400 may include determining hash values based on the virtual IDs, the object, and a hash function (block 440). For example, load balancing server 220 may determine hash values based on the virtual IDs, the object, and the hash function.

Load balancing server 220 may store a hash function in a memory included in or accessible by load balancing server 220. If there are multiple load balancing servers 220 that manage the same group of backend servers 210, then each load balancing server 220 may store the same hash function. In some implementations, the hash function may take the form of a secure hash algorithm, a trivial hash function, a perfect or injective hash function, a heuristic hash function, a rolling hash function, a cryptographic hash function, a message digest algorithm, a RACE integrity primitives evaluation message digest algorithm, or another type of hash function.

Load balancing server 220 may use a virtual ID VID and object identifier O for the object as inputs, or the basis for inputs, for the hash function h to determine a hash value Z (e.g., $h(VID, O)=Z$).

The output or the result of the hash function h is referred to as hash value Z herein. However, in non-weighted rendezvous hashing, the output or the result of the hash function may sometimes be referred to as a "weight." The output or the result of the hash function (e.g., hash value Z or "weight") is separate from, and should not be confused with, the weight of a backend server 210 as previously discussed.

The object identifier O may include an object name for the object, a Uniform Resource Locator (URL) for the object, a username and/or password associated with the object (e.g., a username and/or password for an account authorized to access the object), and/or another type of identifier for the object.

In some implementations, load balancing server 220 may determine hash values Z for each virtual ID VID. For example, assume there are m number of virtual IDs VID (e.g., $VID_1$ to $VID_m$) assigned to n number of backend servers 210 (e.g., backend server 210-1 to backend server 210-n). Accordingly, load balancing server 220 may determine m number of hash values (e.g., $Z_1$ to $Z_m$). For example, load balancing server 220 may calculate $h(VID_1, O)=Z_1$, $h(VID_2, O)=Z_2, \ldots, h(VID_m, O)=Z_m$.

If there are multiple load balancing servers 220 that manage the same backend servers 210, then regardless of which load balancing server 220 determines the hash values, each load balancing server 220 would independently calculate the same hash values Z for the same virtual IDs VID because each load balancing server 220 would use the same hash function h, the same virtual IDs VID, and the same object identifier O.

In some implementations, rather than determining hash values Z for each virtual ID VID, load balancing server 220 may determine hash values Z for only a subset of virtual IDs VID. Accordingly, the processing power required, resources expended, and time spent on determining hash values Z may be lower than when hash values Z are determined for all virtual IDs VID.

The virtual ID information may include a virtual ID hash table that associates an index number with a virtual ID. In some implementations, the virtual IDs for different backend servers 210 may be interlaced within the virtual ID hash table (e.g., the index order of the virtual IDs may mix up virtual IDs for different backend server 210), may be in a random index order, and/or may be organized based on which backend servers 210 are associated with the virtual IDs.

Load balancing server 220 may select a window of indexes from the hash table for which to use associated virtual IDs to determine hash values Z. For example, if there are m number of virtual IDs and indexes, then load balancing server 220 may select a window of size p number of virtual IDs to use to determine hash values, where p number of virtual IDs is less than the total number m of virtual IDs (e.g., p<m).

The size of the window (e.g., p number of virtual IDs) may be based on the weights of the backend servers 210. In some implementations, the size p of the window may be based on the maximum weight of a backend server 210. For instance, the size p of the window may be X times greater than the maximum weight $W_{max}$ of a backend server 210 (e.g., $p=X*W_{max}$) to ensure a large enough window is selected to properly assign objects to backend servers 210. Alternatively, the size p of the window may be equal to the log value of the sum of the weights of backend servers 210-1 to 210-n (e.g., $p=\log(SUM(W_1, W_2, \ldots, W_n))$). Accordingly, even if there are multiple load balancing servers 220, each load balancing server 220 will select a same window size p.

The location of the window within the indexes of the hash table may be based on the object identifier O. For example, load balancing server 220 may use a hash function f and the object identifier O to calculate a reference index value R (e.g., $f(O)=R$). In some implementations, a particular number of bits within the result of f(O) may equal the reference index value R. For example, the last three bits of the result of f(O) may equal the reference index value R. The location of the window may be based on the reference index value R and the size p of the window. For example, the window may be centered around reference index value R such that if the size p of the window is three, then the window may include indexes R−1, R, and R+1. Thus, load balancing server 220 may determine hash values Z for only the virtual IDs associated with the indexes within the window (e.g., indexes R−1, R, and R+1).

In this way, load balancing server 220 may select a subset of virtual IDs for which to determine hash values Z instead of determining hash values Z for all virtual IDs. Accordingly, less processing resources may be used and less time may be taken to determine hash values Z for only a subset of virtual IDs than for all the virtual IDs. Moreover, in some implementations, the total number of IDs in the subset of virtual IDs may be fewer than the total number of backend servers n. In other words, the size p of the window may be smaller than the number of backend servers n. Thus, less processing resources may be used and less time may be taken to determine hash values Z for only a subset of virtual IDs (e.g., p number of virtual IDs) than for n number of backend server IDs as used in non-weighted rendezvous hashing (where p<n).

In some implementations, there may be multiple load balancing servers 220 that manage the same backend servers 210. Regardless of which load balancing server 220 determines the hash values, each load balancing server 220 would independently calculate the same hash values Z for a same object and for the same subset of virtual IDs VID because each load balancing server 220 would use the same hash function f, the same object identifier O, and the same window size p to select a same subset of virtual IDs, and then use the same hash function h, the same virtual IDs VID, and the same object identifier O to calculate the same hash values Z for the subset of virtual IDs.

As further shown in FIG. 4, process 400 may include determining a virtual ID associated with a hash value that satisfies a particular condition (block 450). For example, load balancing server 220 may determine a virtual ID associated with a hash value that satisfies the particular condition.

In some implementations, the particular condition may be a greatest hash value (e.g., a greatest hash value would satisfy the condition). However, the particular condition is not limited to being the greatest hash value. For example the particular condition may be a smallest hash value, a second greatest hash value, a second smallest hash value, etc. For ease of understanding, the particular condition will be assumed to be a greatest hash value in process 400 of FIG. 4 and process 500 of FIG. 5.

Load balancing server 220 may compare the hash values calculated at block 440 and identify a maximum hash value. For example, load balancing server 220 may compare the hash values calculated for each of the total number of virtual IDs, or may compare the hash values calculated for each of the subset of virtual IDs.

As further shown in FIG. 4, process 400 may include selecting a backend server 210 associated with the virtual ID that satisfies the particular condition (block 460). For example, load balancing server 220 may select the backend server 210 associated with the virtual ID based on the virtual ID information.

If there are multiple load balancing servers 220 that manage the same backend servers 210, then regardless of which load balancing server 220 selects a backend server 210 to provide the object for storage, each load balancing server 220 would independently select the same backend server 210 in which to store the object.

As further shown in FIG. 4, process 400 may include providing the object to the backend server 210 (block 470). For example, load balancing server 220 may provide the object to backend server 210.

Backend server 210 may receive the object and store the object in a memory included in or accessible by backend server 210. For example, backend server 210 may cache the object for quick retrieval for when the object is requested.

As previously discussed, when a backend server 210-$n$+1 is added to backend servers 210-1 to 210-$n$, some of the objects stored by backend servers 210-1 to 210-$n$ may be redistributed by load balancing server 220 so that backend server 210-$n$+1 stores some of the objects. The quantity of objects redistributed may be referred to as disruption. A smaller disruption may lead to less resources being used and less time required to transfer objects between backend servers 210 than a larger disruption.

In non-weighted rendezvous hashing, where the objects would be evenly distributed among backend servers 210-1 to 210-$n$+1, the disruption may be proportional to 1/(n+1). On the other hand, in weighted rendezvous hashing as described herein, when hash values are calculated for all the virtual IDs, the disruption may be proportional to $W_{n+1}$/SUM($W_1$, $W_2$, . . . $W_n$, $W_{n+1}$), where W is a weight of a respective backend server 210-1 to 210-$n$+1. Accordingly, the disruption may be smaller using weighted rendezvous hashing than non-weighted rendezvous hashing if the weight $W_{n+1}$ of newly added backend server 210-$n$+1 is less than an average weight of backend servers 210. Similarly, in weighted rendezvous hashing described herein, when hash values are calculated for only a subset of virtual IDs (e.g., a quantity of virtual IDs equal to the size p of the window), the disruption may be proportional to 1/p. Accordingly, the disruption may be smaller using weighted rendezvous hashing than non-weighted rendezvous hashing if the size p of the window is greater than the quantity n+1 of backend servers 210.

Moreover, when a new backend server 210-$n$+1 is added, hash values may have to be recalculated for each object stored by backend servers 210-1 to 210-$n$ to determine which objects should be moved to backend server 210-$n$+1. As previously discussed, a total number of hash values calculated using the weighted rendezvous hashing may be fewer than using non-weighted rendezvous hashing when the size p of the window is less than the number n of backend servers 210. Accordingly, load balancing server 220 may use less processing resources, and use less time, to determine which objects should be moved to a newly added backend server 210-$n$+1.

Furthermore, disruption may be caused by a backend server 210 being removed from backend servers 210-1 to 210-$n$. The disruption may be similarly smaller for weighted rendezvous hashing than for non-weighted rendezvous hashing. For example, if a backend server 210 with a lower than average weight is removed (and hence a lower than average quantity of stored objects), then the quantity of objects that have to be redistributed may be less than would have to be redistributed using non-weighted rendezvous hashing where each backend server 210 stores the same, or roughly the same, quantity of objects. Moreover, backend servers 210 with less than average weights may be more likely to be removed from the backend servers 210 (e.g., within an enterprise data center and/or public cloud) because backend servers 210 with a less than average weight may correspond to older backend servers 210 that have less capacity or processing power than newer backend servers 210 with greater weights.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
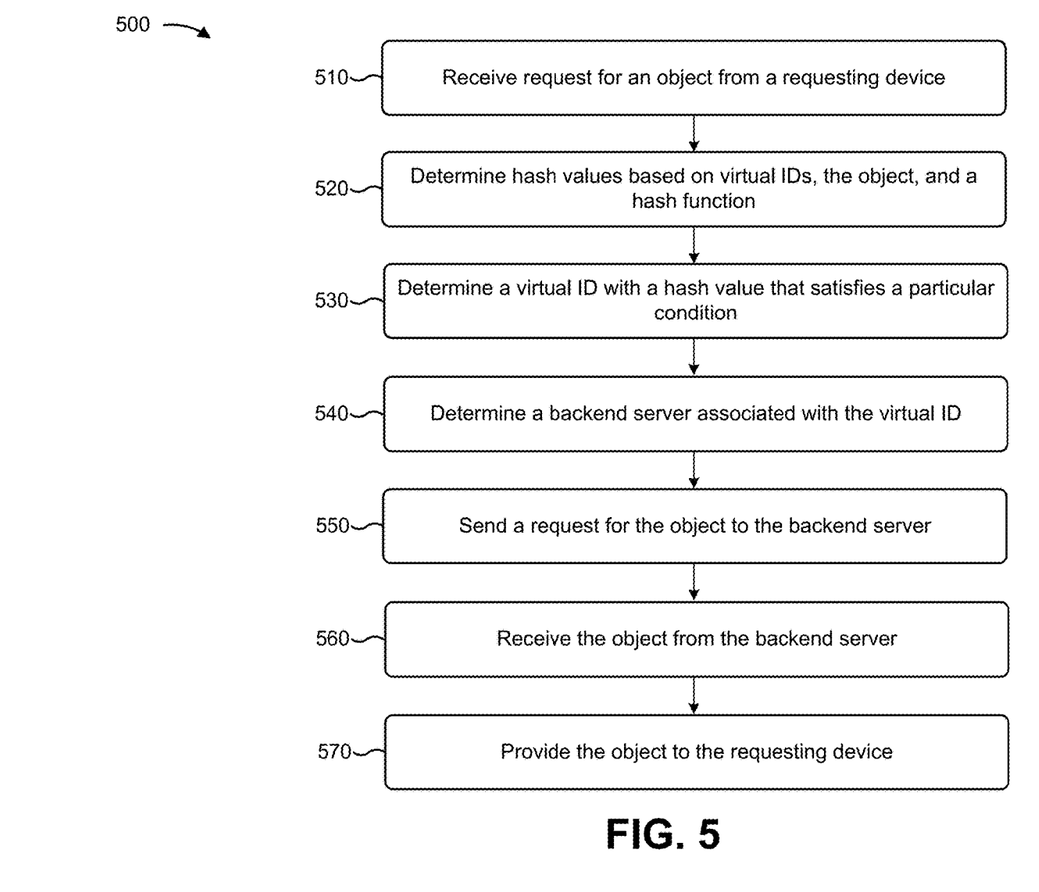
FIG. 5 is a flow chart of an example process for selecting a backend server to which to send a request for an object.

FIG. 5 is a flow chart of an example process 500 for selecting a backend server 210 to which to send a request for an object. In some implementations, one or more process blocks of FIG. 5 may be performed by load balancing server 220. In some implementations, one or more process blocks of FIG. 5 may be performed by another device or a group of devices separate from or including load balancing server 220, such as backend server 210 and/or requesting device 230.

As shown in FIG. 5, process 500 may include receiving a request for an object from a requesting device 230 (block 510). For example, load balancing server 220 may receive the request for the object.

Requesting device 230 may send a request to load balancing server 220 for the object to be provided to requesting device 230. Load balancing server 220 may receive the request from requesting device 230.

Accordingly, load balancing server 220 may determine a backend server 210 that stores the object and to which a request for the object should be sent. Moreover, if there are multiple load balancing servers 220 that manage the same backend servers 210, then regardless of which load balancing server 220 receives the request from requesting device 230, each load balancing server 220 should independently select the same backend server 210 to send a request for the object.

As further shown in FIG. 5, process 500 may include determining hash values based on the virtual IDs, the object, and a hash function (block 520). For example, load balancing server 220 may determine hash values as described with respect to block 440 in FIG. 4 using the same hash function as block 440.

As further shown in FIG. 5, process 500 may include determining a virtual ID associated with a hash value that satisfies a particular condition (block 530). For example, load balancing server 220 may determine a virtual ID associated with a hash value that satisfies a particular condition as described with respect to block 450 in FIG. 4.

As further shown in FIG. 5, process 500 may include selecting a backend server 210 associated with the virtual ID having the hash value that satisfies the particular condition (block 540). For example, load balancing server 220 may select the backend server 210 as described with respect to block 460 in FIG. 4.

As further shown in FIG. 5, process 500 may include sending the request for the object to the selected backend server 210 (block 550). For example, load balancing server 220 may send the request to the selected backend server 210.

If there are multiple load balancing servers 220 that manage the same backend servers 210, then regardless of which load balancing server 220 selects backend server 210 from which to request the object, each load balancing server 220 would independently select the same backend server 210 to which to send the request.

The selected backend server 210 may receive the request for the object and retrieve the object from storage. The selected backend server 210 may send the object to load balancing server 220 that requested the object.

As further shown in FIG. 5, process 500 may include receiving the object from backend server 210 (block 560). For example, load balancing server 220 may receive the object from the selected backend server 210.

As further shown in FIG. 5, process 500 may include providing the object to the requesting device 230 (block 570). For example, load balancing server 220 may send the object to requesting device 230. Requesting device 230 may receive the object sent from load balancing server 220.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Furthermore, although process 500 is primarily described with respect to receiving a request for a stored object and sending the object to a requesting device 230, process 500 may also be applied to distributing processing tasks among backend servers 210 and sending a processing result to a requesting device 230. In other words, an object may be a processing task.

For example, load balancing server 220 may receive a request for a processing task to be performed at block 510. Load balancing server 220 may select a backend server as described with respect to blocks 520-540. In some implementations, the object identifier O may identify the processing task. Thus, the same backend server 210 may be selected to perform the same processing task each time the processing task is requested. Alternatively, the object identifier O may identify requesting device 230 (e.g., a requesting device name, a requesting device Internet Protocol (IP) address, etc.). Thus, the same backend server 210 may be selected to perform processing tasks each time a particular requesting device 230 requests a processing task be performed. Load balancing server 220 may send a request to perform the processing task to the selected backend server 210 at block 550 and the selected backend server 210 may perform the processing task. Backend server 210 may send a result of the processing to load balancing server 220 and load balancing server 220 may receive the result at block 560. Load balancing server 220 may send the result to requesting device 230 at block 570.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6D are diagrams of an example implementation 600 relating to example processes 400 and 500 shown in FIGS. 4 and 5, respectively. FIGS. 6A-6D show an example of selecting a backend server 210 to store an object and selecting a backend server 210 to which to send a request for an object.

Figure 6A:
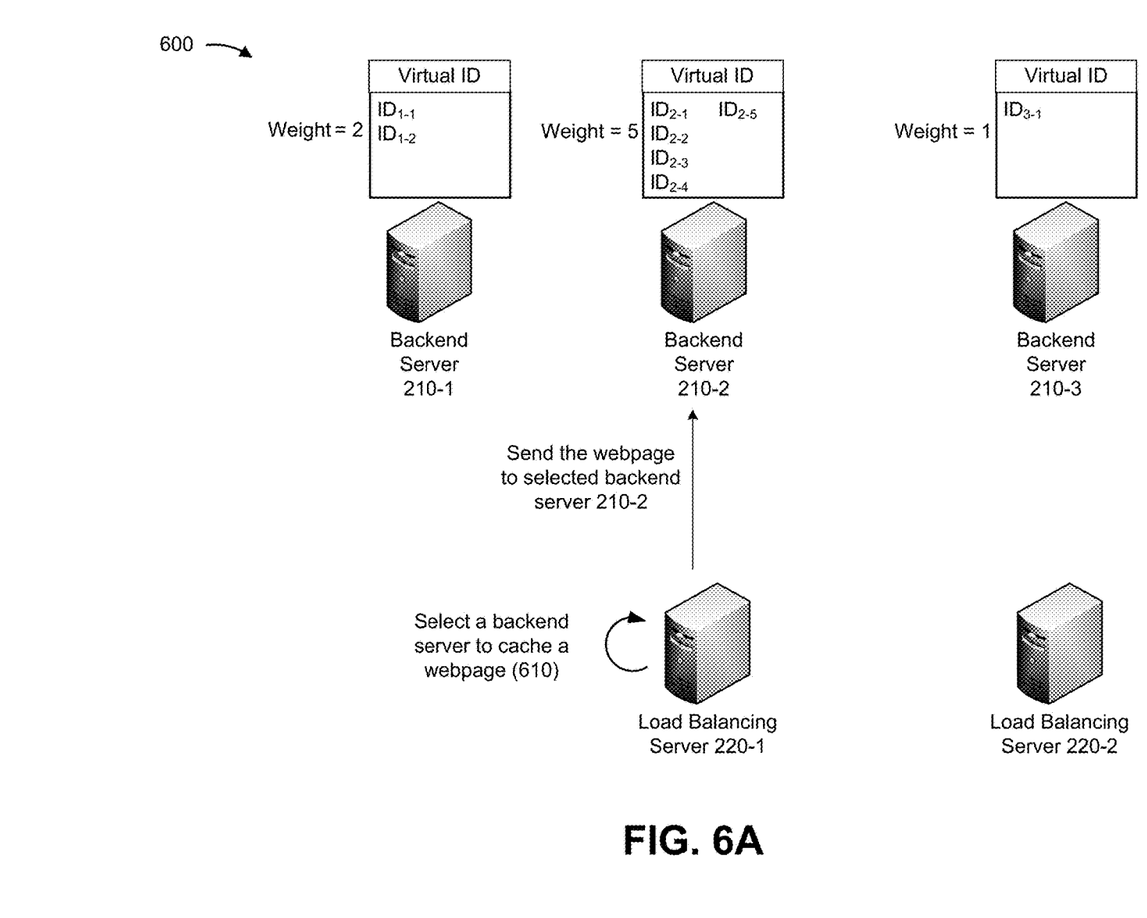
FIGS. 6A-6D are diagrams of an example implementation relating to the example processes shown in FIGS. 4 and 5.

As shown in FIG. 6A, assume load balancing servers 220-1 and 220-2 balance loads across backend servers 210-1 to 210-3. Also, assume backend server 210-1 has been assigned a weight 2, backend server 210-2 has been assigned a weight 5, and backend server 210-3 has been assigned a weight 1 and that each backend server 210 is associated with a quantity of virtual IDs equal to a respective weight. For example, backend server 210-1 is associated with virtual IDs $ID_{1-1}$ and $ID_{1-2}$; backend server 210-2 is associated with virtual IDs $ID_{2-1}$, $ID_{2-2}$, $ID_{2-3}$, $ID_{2-4}$, and $ID_{2-5}$; and backend server 210-3 is associated with virtual ID $ID_{3-1}$.

Assume load balancing server 220-1 receives a webpage (e.g., an object) to be cached by one of backend servers 210-1 to 210-3. Assume the webpage is identified by a URL. Load balancing server 220-1 may select a backend server 210 to cache the webpage using weighted rendezvous hashing (as shown by reference number 610). The weighted rendezvous hashing that occurs will be discussed in further detail with respect to FIGS. 6C and 6D. Assume load balancing server 220-1 selects backend server 210-2 based on the weighted rendezvous hashing. Thus, load balancing server 220-1 may send the webpage to backend server 210-2. Backend server 210-2 may receive the webpage and store the webpage in a cached manner.

Figure 6B:
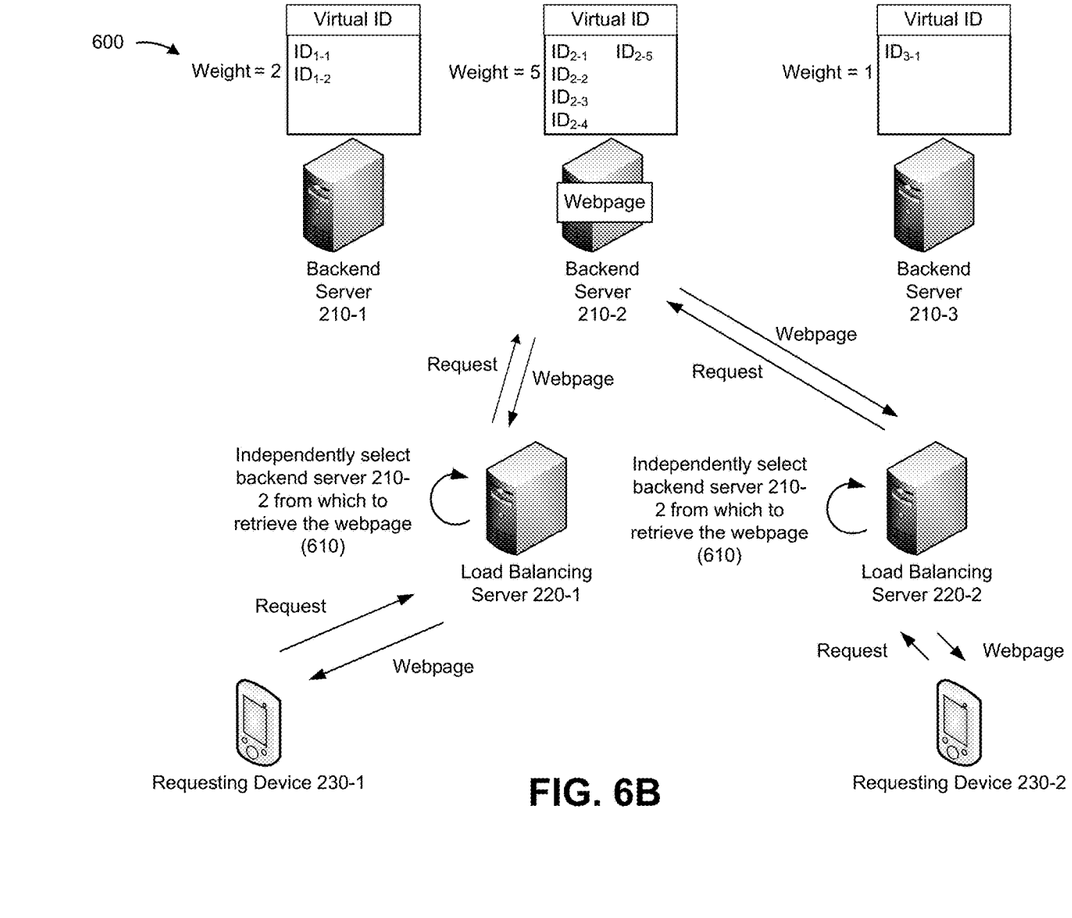

As shown in FIG. 6B, requesting devices 230-1 and 230-2 (e.g., mobile phones) may each send a request for the webpage via network 240 (not shown). The requests may be received by different load balancing servers 220-1 and 220-2 as shown in FIG. 6B. Each load balancing server 220-1 and 220-2 may independently perform the weighted rendezvous hashing (as shown by reference number 610) to independently select the same backend server 210-2 that stores the webpage. Load balancing servers 220-1 and 220-2 may each send backend server 210-2 a request for the webpage. Backend server 210-2 may send the webpage to each of load balancing servers 220-1 and 220-2, and load balancing servers 220-1 and 220-2 may send the webpage to the requesting devices 230-1 and 230-2.

Figure 6C:
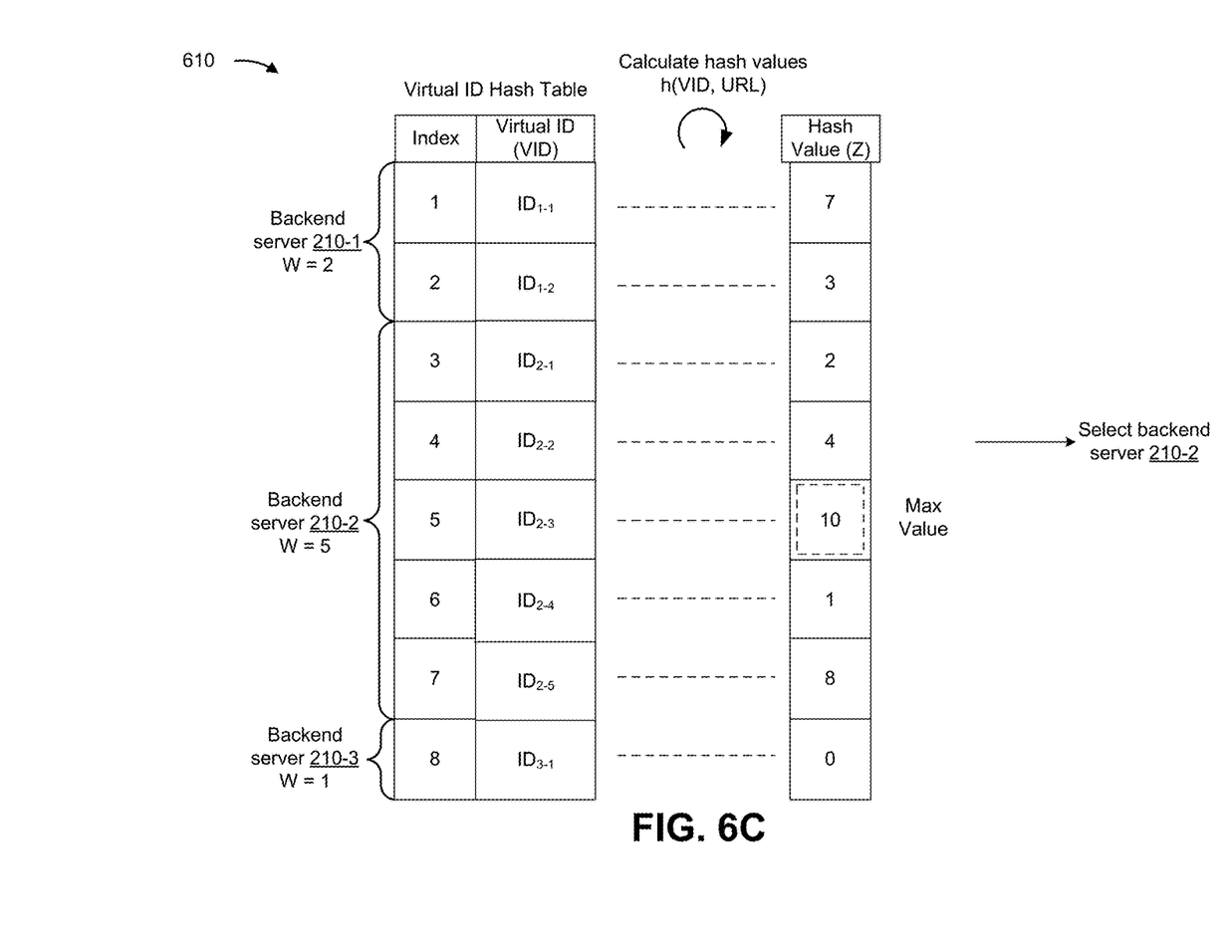

FIG. 6C illustrates a first example of using weighted rendezvous hashing to select a backend server 210 (as shown by reference number 610). For example, in FIG. 6C, load balancing server 220 (e.g., load balancing server 220-1 and/or 220-2) may perform weighted rendezvous hashing on all virtual IDs for backend servers 210-1 to 210-3.

As shown in FIG. 6C, load balancing server 220 may store a virtual ID hash table that associates index values and the virtual IDs for backend servers 210-1 to 210-3. Load balancing server 220 may also store a hash function h used to calculate hash values Z. As shown in FIG. 6C, load balancing server 220 may calculate a hash value, for each virtual ID (VID), based on the virtual ID and the URL for the webpage. In other words, load balancing server 220 may calculate h(VID, URL)=Z for each virtual ID. Load balancing server may compare the calculated hash values Z and determine the maximum hash value. For example, as shown in FIG. 6C, the maximum hash value may be a value of 10 and be associated with virtual ID $ID_{2-3}$ (e.g., $h(ID_{2-3}, URL)$=10). Load balancing server 220 may determine that virtual ID $ID_{2-3}$ is associated with backend server 210-2 based on virtual ID information stored by load balancing server 220. Accordingly, load balancing server 220 may select backend server 210-2 based on the weighted rendezvous hashing.

Figure 6D:
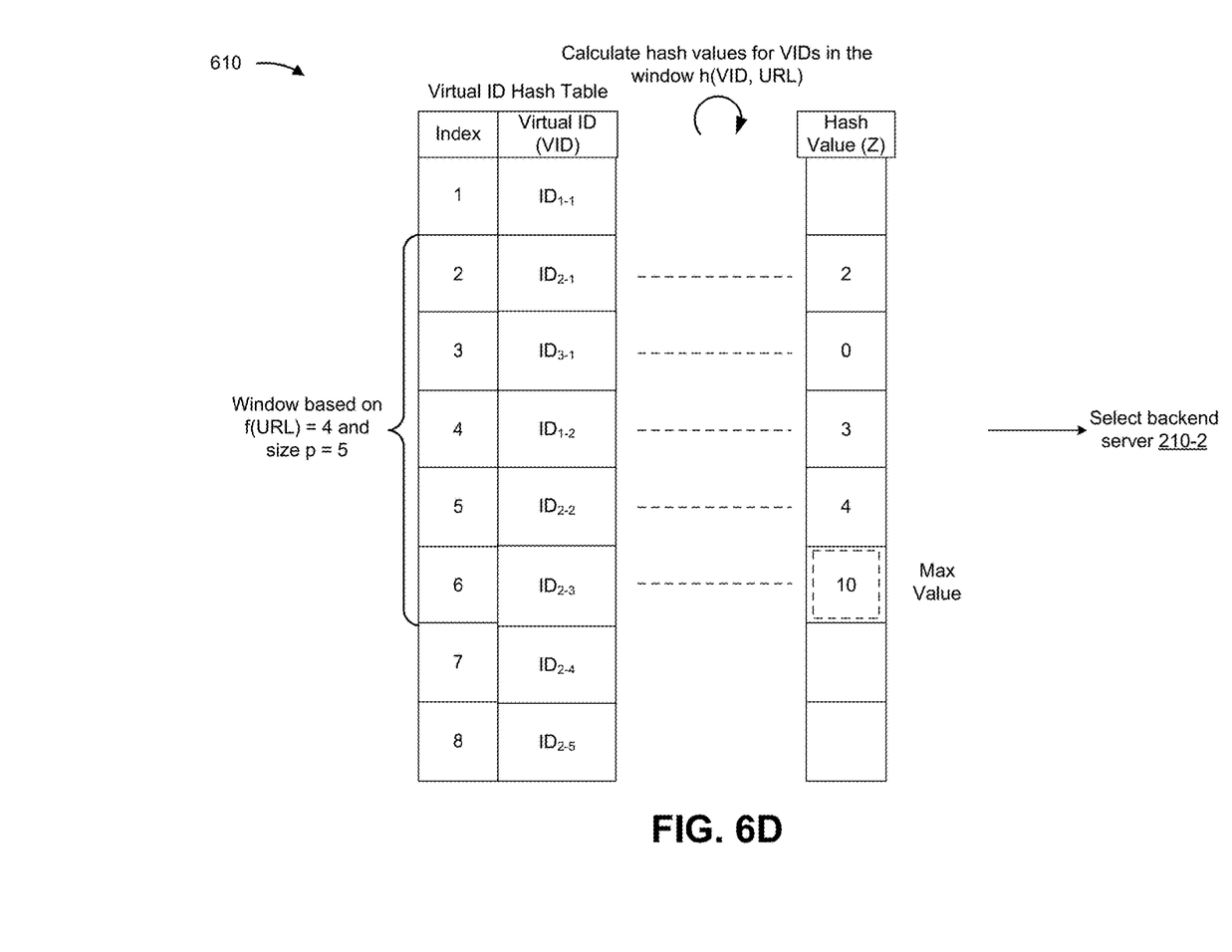

FIG. 6D illustrates a second example of using weighted rendezvous hashing to select a backend server 210 (as shown by reference number 610). For example, in FIG. 6D, load balancing server 220 (e.g., load balancing server 220-1 and/or 220-2) may perform weighted rendezvous hashing on a subset of virtual IDs for backend servers 210-1 to 210-3.

As shown in FIG. 6D, load balancing server 220 may store a virtual ID hash table that associates index values and the virtual IDs for backend servers 210-1 to 210-3. The virtual ID hash table may interlace the virtual IDs from different backend servers 210-1 to 210-3 as shown in FIG. 6D. Load balancing server 220 may also store a hash function h used to calculate hash values Z and a hash function f used to calculate a reference index value R. Hash function h and hash function f may be the same hash function or different hash functions.

Assume load balancing server 220 calculates a reference index value R based on the hash function f and the URL of the website (e.g., f(URL)=R). Also, assume that load balancing server 220 calculates the reference index value R to be equal to 4 (e.g., f(URL)=4). Further, assume load balancing server 220 stores information indicating a window should have a size p=5. Accordingly, the reference index value R being equal to 4 may indicate that the window should be centered on index 4, and the window size p being equal to 5 may indicate that the window should span from indexes 2-6. Accordingly, anytime the URL for the website is used to select a window, the same window from indexes 2-6 will be selected.

As further shown in FIG. 6D, load balancing server 220 may calculate a hash value, for each virtual ID (VID) in the window (e.g., virtual IDs associated with indexes 2-6), based on the virtual ID and the URL for the webpage. In other words, load balancing server 220 may calculate h(VID, URL)=Z for only virtual IDs $ID_{2-1}$, $ID_{3-1}$, $ID_{1-2}$, $ID_{2-2}$, and $ID_{2-3}$. Load balancing server may compare the calculated hash values Z and determine the maximum hash value. For example, as shown in FIG. 6D, the maximum hash value may be a value of 10 and be associated with virtual ID $ID_{2-3}$. Load balancing server 220 may determine that virtual ID $ID_{2-3}$ is associated with backend server 210-2 based on virtual ID information stored by load balancing server 220. Accordingly, load balancing server 220 may select backend server 210-2 based on the weighted rendezvous hashing.

As indicated above, FIGS. 6A-6D are provided merely as an example. Other examples are possible and may differ from what was described with regard to FIGS. 6A-6D.

Implementations described herein may assign weights to backend servers such that rendezvous hashing may distribute a load among the backend servers based on the weights of the backend servers. Moreover, implementations described herein may ensure consistency, distribution, and weighting are achieved on a traffic load balancing server while load balancing the backend servers. Furthermore, implementations described herein may reduce a disruption caused by a backend server being added or removed compared to non-weighted rendezvous hashing, and may reduce an amount of processing resources used when selecting a backend server compared to non-weighted rendezvous hashing.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   store virtual identifier information indicating a plurality of virtual identifiers associated with a plurality of servers,
   the virtual identifier information associating a virtual identifier, of the plurality of virtual identifiers, based on a weight associated with a server of the plurality of servers;
   receive an object identifier identifying an object to be processed by at least one of the plurality of servers;
   determine a size of a window based on the weight;
   select a subset of the plurality of virtual identifiers based on the size of the window and the object identifier;
   calculate hash values for the subset of the plurality of virtual identifiers based on selecting the subset of the plurality of virtual identifiers;
   determine a particular virtual identifier associated with a hash value that satisfies a particular condition,
   the hash values including the hash value, and
   the subset of the plurality of virtual identifiers including the particular virtual identifier;
   select a particular server associated with the particular virtual identifier; and
   send an instruction to the server to process the object.

2. The device of claim 1, where a quantity of virtual identifiers, in the subset of the plurality of virtual identifiers, is equal to the weight associated with the server.

3. The device of claim 2, where the quantity of virtual identifiers is greater than one for at least another server of the plurality of servers.

4. The device of claim 1, where the one or more processors are further to:
   provide the object to the particular server to store.

5. The device of claim 1,
   where the one or more processors are further to:
   send a request to send the object to the device, and
   where the one or more processors are further to:
   receive the object from the particular server based on the request.

6. The device of claim 1,
   where the object is a task, and
   where the one or more processors, when sending the instruction to the particular server to process the object, are to:
   instruct the particular server to perform the task.

7. The device of claim 1, where the hash value is a greatest hash value of the hash values.

8. A computer-readable medium storing instructions, the instructions comprising:
   one or more instructions that, when executed by one or more processors, cause the one or more processors to:
   store virtual identifier information indicating a plurality of virtual identifiers associated with a plurality of servers,
   the virtual identifier information associating a quantity of virtual identifiers, of the plurality of virtual identifiers, with a server of the plurality of servers based on a weight associated with the server;
   receive an object identifier identifying an object to be stored by at least one of the plurality of servers;
   determine a size of a window based on the weight;

select a subset of the plurality of virtual identifiers based on the size of the window and the object identifier;
calculate hash values for the subset of the plurality of virtual identifiers based on selecting the subset of the plurality of virtual identifiers;
determine a virtual identifier associated with a hash value that satisfies a particular condition,
the hash values including the hash value, and
the subset of the plurality of virtual identifiers including the virtual identifier;
select a particular server associated with the virtual identifier; and
send the object to the particular server to be stored.

9. The computer-readable medium of claim 8, where the one or more instructions, that cause the one or more processors to calculate the subset of the hash values for the plurality of virtual identifiers, cause the one or more processors to:
calculate a respective one of the hash values for each of the subset of the plurality of virtual identifiers.

10. The computer-readable medium of claim 8, where the one or more instructions, that cause the one or more processors to calculate the hash values for the plurality of virtual identifiers, cause the one or more processors to:
calculate a respective one of the hash values for the subset of the plurality of virtual identifiers,
the subset of the plurality of virtual identifier being fewer than all of the plurality of virtual identifiers.

11. The computer-readable medium of claim 10,
where the virtual identifier information includes a hash table associating an index value with each of the plurality of virtual identifiers, and
where the one or more instructions, that cause the one or more processors to select the subset, cause the one or more processors to:
determine a reference index value included in the hash table based on the object identifier; and
select the subset of the plurality of virtual identifiers based on the reference index value and the hash table.

12. The computer-readable medium of claim 10, where a quantity of virtual identifiers included in the subset of the plurality of virtual identifiers is based on the weight.

13. The computer-readable medium of claim 10, where the weight is a maximum weight of weights associated with the plurality of servers.

14. The computer-readable medium of claim 10, where a first quantity of virtual identifiers included in the subset of the plurality of virtual identifiers is less than a second quantity of the plurality of servers.

15. A method, comprising:
storing, by a device, virtual identifier information indicating a plurality of virtual identifiers associated with a plurality of servers,
the virtual identifier information associating a virtual identifier, of the plurality of virtual identifiers, based on a weight assigned to a server of the plurality of servers;
receiving, by the device, an object identifier identifying an object requested by a requesting device;
determining, by the device, a size of a window based on the weight;
selecting, by the device, a subset of the plurality of virtual identifiers based on the size of the window and the object identifier;
calculating, by the device, hash values for the subset of the plurality of virtual identifiers based on selecting the subset of the plurality of virtual identifiers;
determining, by the device, a particular virtual identifier associated with a hash value that satisfies a particular condition,
the hash values including the hash value, and
the subset of the plurality of virtual identifiers including the particular virtual identifier;
selecting, by the device, a particular server associated with the particular virtual identifier;
obtaining, by the device, the object from the particular server; and
sending, by the device, the object to the requesting device.

16. The method of claim 15, further comprising:
generating the plurality of virtual identifiers based on the weight.

17. The method of claim 15, further comprising:
receiving the virtual identifier information from another device.

18. The method of claim 15, where calculating the hash values for the plurality of virtual identifiers comprises:
calculating a respective one of the hash values by using the object identifier and a respective virtual identifier as inputs to a hash function.

19. The method of claim 15, where each of the plurality of virtual identifiers has an equal probability of being associated with the hash value that satisfies the particular condition.

20. The method of claim 15, where obtaining the object from the particular server comprises:
sending a request to the particular server to send the object to the device; and
receiving the object from the particular server after sending the request.

* * * * *